2,716,072

METHYLCELLULOSE COMPOSITION AND METHOD

William J. Hanson, Long Beach, Calif., assignor to The Dow Chemical Company, Midland, Mich., a corporation of Delaware No Drawing. Application June 5, 1951,
Serial No. 230,067

3 Claims. (Cl. 106—186)

The invention relates to methylcellulose and is particularly directed to an improved methylcellulose composition adapted to disperse readily on contact with water, and to a method for producing such composition.

Methylcellulose is a water-soluble cellulose ether derived by reacting purified cotton or wood cellulose (in the form of alkali cellulose) with methyl chloride. The degree of methoxyl substitution is approximately two groups per anhydro-glucose residue in the cellulose chain. The methoxyl content of the product varies from 27.5 to 31 per cent. The methylcellulose powder with which the present invention is concerned is a very finely divided product, frequently rated in terms of its aqueous solutions as being of low, medium and high viscosity type, of which 15, 400, and 4000 centipoise materials, respectively, are representative. The product is characterized by being soluble (but with some difficulty) in cold water and substantially insoluble in hot water.

Methylcellulose of various forms and viscosity rating has become an article of commerce, aqueous dispersions of which are commonly employed as thickeners in many different applications and preparations. The physical and chemical properties of the material, its relative stability, its lack of toxicity to warm-blooded animals, and its availability at an attractive cost, all have contributed to its use in many fields.

The wide acceptance and use of methylcellulose have brought into sharp focus one particularly disadvantageous characteristic of the material, i. e., the difficulty with which it is initially dispersed in water. Thus, methylcellulose will not readily disperse and dissolve in water at ordinary room temperatures, and even the most finely divided methylcellulose powder tends to absorb water on its surfaces to form a gelatinous covering which prevents the interior of the material from wetting and dissolving over considerable periods of time.

This difficulty in accomplishing the dispersion of methylcellulose has materially limited its application. Efforts to circumvent the solubility disability by supplying the material in the form of aqueous concentrates have not been particularly successful since about 15 per cent by weight is the maximum solubility of low viscosity methylcellulose in water, and with the medium and high viscosity products, even less can be dispersed under usual conditions.

It is an object of the present invention to provide a free-flowing finely-divided methylcellulose composition adapted to be readily dispersed in cold water. A further object is to provide such composition in dry, pulverulent, non-hygroscopic form. A further object is to provide a method for producing such a methylcellulose composition. Other objects will become apparent from the following specification and examples.

In accordance with the present invention, it has been discovered that the wetting and dispersing properties of powdered methylcellulose in cold water are tremendously improved by the blending with the methylcellulose of (1) sodium acetate and (2) a finely divided solid synthetic anionic wetting agent of the group consisting of organic sulfates and sulfonates and their salts, to obtain a free flowing finely divided product. A critical feature of this method resides in the intimate dispersion of the sodium acetate and wetting agent in and on the methylcellulose particles. A second feature consists of the particular synthetic wetting agents employed. Liquid wetting agents cause undesirable alteration of the powdery consistency of the methylcellulose, and wetting agents of other types do not appear to accomplish the desired result.

The pulverulent product obtained in accordance with the invention is unique in its dispersing properties in cold water, and particularly at temperatures ranging from 40° C. downward to and approaching 0° C. The new composition retains its finely divided characteristics, is not hygroscopic, and does not tend to pack or form lumps on storage. It wets readily on contact with water, and when strewn or sifted over the surfaces of cold water in spray tanks or compounding vessels passes quickly into solution with a minimum of agitation. This is in sharp contrast to conventional methylcellulose powder, which, when thrown into or onto water surfaces, tends to form aggregates, the outside only of which are wet and which dissolve but slowly regardless of the degree of agitation employed. Also, the improved result significantly differentiates over that obtainable with the binary mixture of methylcellulose and wetting agent, in which instance the solubility properties in water below 15° C. are very poor.

Sodium acetate is a solid product preferably employed in the anhydrous form but operable in the present invention as sodium acetate hydrate ($NaC_2H_3O_2.3H_2O$). It is commonly obtainable in either pulverulent or finely divided crystalline form, and is so preferred in the present operation. An essential limitation on the methylcellulose powder is that it be finely divided and preferably that at least 80 per cent of its particles pass thru a 60 mesh screen (Tyler screen series). Best results are obtained when at least 75 per cent of the material passes thru a 100 mesh screen. A preferred embodiment of the invention resides in those compositions in which the methylcellulose is of the high viscosity type, e. g. 4000 centipoise rating, although low and medium viscosity type materials may be used if characterized by proper particle size.

The expression "Tyler screen series" is used herein in accordance with the teaching concerning Tyler Standard Screen Scale Sieves found on page 882 of Handbook of Chemistry by Lange, seventh edition, published in 1949 by Handbook Publishers, Inc., of Sandusky, Ohio.

The organic sulfate and sulfonate wetting agents as herein employed are finely divided powders readily available in commerce e. g. Ernalpon D-7 (alkylol amido sulphate), Oronite D-40 (alkyl aryl sodium sulfonate), Nacconol HG (alkyl aryl sulfonate), IN—181—P (sodium lauryl sulfate). Of the foregoing, Ernalpon D-7 (Betramine R) is a product of the Alframine Corporation and is defined in Encyclopedia of Surface Active Agents by Sisley and Wood, Chemical Publishing Company, Inc., of New York, New York (1952) as being a "sulfonate of condensation product of ethylene oxide with the amides of the fatty acids of coconut oil, 40% fat content," as described in U. S. Patents Nos. 2,185,817, 2,186,464 and 2,264,766.

Oronite D-40 is described in the booklet Detergents, published in the United States of America in 1952 by Oronite Chemical Company, as a sodium alkyl aryl sulfonate derived from a petroleum-base hydrocarbon and marketed as a granular 40% active product having a density of 0.57.

Naccanol HG is described in Encyclopedia of Surface Active Agents, Ibid., as corresponding to Naccanol NR shown to be an alkyl benzene sulfonate wherein the alkyl group contains from 12 to 18 carbon atoms.

Any suitable proportions of materials may be employed, although compositions in which the constituents are present in the range of 30–70 per cent by weight of methylcellulose, 10–20 per cent by weight of wetting agent, and 20–50 per cent by weight of sodium acetate are those particularly recommended in accordance with the present invention. The exact proportions of wetting agent may vary considerably depending upon the particular wetting agent employed and upon the viscosity characteristics of the methylcellulose.

The method for compounding the methyl cellulose, wetting agent and sodium acetate to produce a product of maximum utility, comprises a very exhaustive grinding and milling of the several ingredients together to accomplish a dispersion of each ingredient with the others. Failure to accomplish the formation of a homogeneous blend and one in which the several ingredients are most intimately associated together in finely divided form, generally results in an inferior composition.

In formulating the new composition, the several ingredients in suitable finely divided form may first be mixed together and thereafter intimately blended or milled in conventional ball-milling, hammer-milling or micropulverizing equipment. Alternatively, methylcellulose, sodium acetate and wetting agent in any available state of subdivision may be roughly mixed together and thereafter comminuted to obtain a product of the desired particle size.

While it is not intended to restrict the invention by any theory of operation, it would appear possible that in the intimately blended mixture, solution of the sodium acetate constituent takes place so rapidly that water penetrates into the resulting interstices and wets and disperses the methylcellulose before any gelatinous protecting layer can be formed. Thus the formation of difficultly dispersible agglomerates is avoided.

Illustrative of the present invention is the compounding toeghert of 50 parts by weight of 4000 centipoise powdered methylcellulose with 35 parts by weight of sodium acetate and 15 parts by weight of an alkylol amido sulfate composition. The particle size distribution of the methylcellulose was 1.0 per cent on 60 mesh screen (Tyler screen series), 9.4 per cent of 60–100 screen mesh size and 89.6 per cent thru a 100 mesh screen. The sodium acetate was in the form of anhydrous powder. The wetting agent was a finely divided commercial product marketed as Ernalpon D–7. The several powdered constituents were mixed together and ball-milled for several hours. Examination of the resulting product indicated it as being a very intimate dispersion in which the constituents were thoroughly intermingled each with the others and having both sodium acetate and wetting agent embedded in the methyl cellulose particles. The dispersibility of this product in distilled water varying in temperature from 0° to 40° C. was determined by dropping about 0.1 gram of the composition into 125 milliliters of water and stirring gently with a rod for three minutes. Over this range of temperatures, and in the time indicated, there was complete dispersion of the composition with no clumps or aggregates of methylcellulose showing in or on the water or on the surfaces of the stirring rod or container. In further determinations, the composition was found to disperse readily and completely in available surface waters employing the tank mixing facilities available in conventional spray equipment. In this connection, the present and related compositions were found valuable as additaments to agricultural materials. On storing, the composition as here obtained, retained its free-flowing characteristics and did not tend to cake or form agglomerates.

In similar operations the following compositions are obtained:

*Composition A*

| | Per cent by weight |
|---|---|
| Methylcellulose (high viscosity) | 50 |
| Alkyl aryl sodium sulfonate (Oronite D–40) | 15 |
| Anhydrous sodium acetate | 35 |

This mixture was prepared by passing the roughly mixed materials twice thru a micropulverizer using a 0.013 inch screen and medium feed rate. There was no caking in the mill and the product dispersed equally well in hard and soft water.

*Composition B*

| | Per cent by weight |
|---|---|
| Methylcellulose (medium viscosity) | 70 |
| Sodium lauryl sulfate (IN—181—P) | 10 |
| Anhydrous sodium acetate | 20 |

This mixture of ingredients is passed several times thru a hammermill with a 0.013 inch mesh screen to obtain a free-flowing composition readily dispersible in cold water and non-caking on storage.

*Composition C*

| | Per cent by weight |
|---|---|
| Methylcellulose (low viscosity) | 40 |
| Alkyl aryl sulfonate (Naccanol HG) | 20 |
| Sodium acetate hydrate | 40 |

Upon ball-milling the foregoing mixture for several hours, a finely divided composition is obtained having the property of dispersing readily in cold water and which does not cake on storage.

*Composition D*

| | Per cent by weight |
|---|---|
| Methylcellulose (15 centipoises) | 50 |
| Alkylol amido sulfate (Ernalpon D–7) | 15 |
| Anhydrous sodium acetate | 35 |

This mixture was ball-milled for several hours to obtain a free flowing composition having the property of readily dispersing in water and which did not cake on storage.

I claim:

1. A free-flowing pulverulent methylcellulose composition, adapted readily to wet with and dissolve in water over a temperature range of 0°–40° C., which comprises 30–70 per cent by weight of methylcellulose of particle size of 60 screen mesh and smaller (Tyler screen series), 20–50 per cent by weight of sodium acetate, and 10–20 per cent by weight of a solid synthetic anionic wetting agent of the formula,

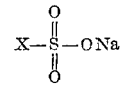

wherein X represents one of the structures lauryloxy, coconut oil-fatty acid amido-polyethyleneoxy, and (long-chain alkyl)-phenyl, the several constituents being in intimate dispersion each with the others.

2. A method for improving the wetting and dispersing properties of methylcellulose in water over a temperature range of 0°–40° C., which includes the step of intimately blending 30–70 parts by weight of methylcellulose of particle size of 60 screen mesh and smaller (Tyler screen series), 20–50 parts by weight of sodium acetate, and 10–20 parts by weight of a solid synthetic anionic wetting agent of the formula,

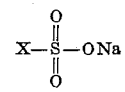

wherein X represents one of the structures lauryloxy, coconut oil-fatty acid amido-polyethyleneoxy, and (long-chain alkyl)-phenyl, so as to obtain a free-flowing pulverulent methylcellulose composition in which the several constituents are intimately dispersed each with the others.

3. A free-flowing pulverulent methyl cellulose composition, adapted readily to wet with and dissolve in water over a temperature range of 0°–40° C., which comprises 30–70 percent by weight of methylcellulose of particle size of 60 screen mesh and smaller (Tyler screen series), 20–50 percent by weight of sodium acetate, and 10–20 percent by weight of sodium lauryl sulfate, the several constituents being in intimate dispersion each with the others.

References Cited in the file of this patent

UNITED STATES PATENTS

| | | |
|---|---|---|
| 1,377,843 | Liddle | May 10, 1921 |
| 2,364,767 | Zizinia | Dec. 12, 1944 |

FOREIGN PATENTS

| | | |
|---|---|---|
| 417,394 | Great Britain | Oct. 4, 1934 |
| 924,623 | France | Aug. 11, 1947 |
| 153,057 | Austria | Apr. 11, 1938 |

OTHER REFERENCES

Zimmerman et al., "Handbook of Material Trade Names," 1946, pages 295 and 321.

Vaugh et al., Jour. Oil Chem. Soc., Dec. 1949, pages 733–737.